(12) United States Patent
Lauzier et al.

(10) Patent No.: US 8,033,226 B2
(45) Date of Patent: *Oct. 11, 2011

(54) LOCKING MECHANISM FOR RECONFIGURABLE PALLETS

(75) Inventors: Nicolas Lauzier, Ste-Flavie (CA);
Robin Stevenson, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

This patent is subject to a terminal disclaimer.

(21) Appl. No.: 12/056,681

(22) Filed: Mar. 27, 2008

(65) Prior Publication Data

US 2009/0241810 A1  Oct. 1, 2009

(51) Int. Cl.
*B65D 19/44* (2006.01)
(52) U.S. Cl. ...................................... 108/55.3
(58) Field of Classification Search ............. 108/51.11, 108/55.1, 55.3, 55.5, 56.1, 56.3, 57.2; 248/346.03; 206/386; 410/98, 77, 81, 91
See application file for complete search history.

(56) References Cited

U.S. PATENT DOCUMENTS

| | | | | |
|---|---|---|---|---|
| 3,622,114 A * | 11/1971 | McIntire, Jr. | ............... | 108/55.5 |
| 3,753,407 A * | 8/1973 | Tilseth | ......................... | 108/55.3 |
| 4,015,710 A * | 4/1977 | Biggs | ........................... | 108/55.5 |
| 4,729,536 A * | 3/1988 | Scala | ........................... | 248/429 |
| 4,732,528 A * | 3/1988 | Good | ........................... | 108/55.1 |
| 4,774,892 A * | 10/1988 | Ballard et al. | ............... | 108/55.3 |
| 4,782,763 A * | 11/1988 | Salloum | ........................ | 108/55.3 |
| 5,497,708 A * | 3/1996 | Jeruzal | ........................ | 108/55.3 |
| 5,722,330 A * | 3/1998 | Staggers | ..................... | 108/55.3 |
| 5,842,424 A * | 12/1998 | Prevot et al. | ................ | 108/55.3 |
| 5,970,885 A * | 10/1999 | Polando | ...................... | 108/55.3 |
| 7,044,066 B1 * | 5/2006 | Miller | .......................... | 108/55.3 |
| 2004/0103826 A1 * | 6/2004 | Ponzio | ......................... | 108/55.3 |

* cited by examiner

*Primary Examiner* — Jose V Chen
(74) *Attorney, Agent, or Firm* — Quinn Law Group, PLLC

(57) ABSTRACT

A pallet includes a platform and a plurality of support assemblies located at multiple positions on the platform. One support assembly is associated with each location of the component to be supported. Each support assembly has a linkage assembly to support and enable movement of a support element. The support assemblies also each include multiple bases secured to the platform, to position the support element in a desired location for each version of a component. A locking mechanism on each support element allows for selectively preventing vertical movement of the support element relative to the pallet.

18 Claims, 10 Drawing Sheets

LOCKING MECHANISM FOR RECONFIGURABLE PALLETS

TECHNICAL FIELD

The present invention relates generally to pallets for assembly plants, and more specifically to a reconfigurable pallet.

BACKGROUND OF THE INVENTION

During assembly of vehicles in an assembly plant individual components must be supported prior to installation in the vehicle. In the case of heavy or bulky components it may be necessary or desirable to support these components in a specific configuration which facilitates installation of the component into the vehicle. For example, it may be desirable to support the component in an orientation which corresponds to its in-vehicle orientation and in a manner which enables access to locations, such as boltholes, used to attach the component to the vehicle.

An example of this is a vehicle engine or powertrain (i.e. engine plus transmission), where engine and/or powertrain specific support structures are used for the purpose of presenting the engine or powertrain to the vehicle body in a manner which facilitates attachment of the engine or powertrain to the vehicle body.

Commonly, customers may be offered various hardware options, such as engines or powertrains, with a specific vehicle body. Hence, to meet the need described above, multiple support structures must be employed each of which will be specific to a single hardware option or component version and which will be incapable of being used for other options. Frequently, for convenience and to ensure their strength and rigidity, these support structures are mounted on a platform. Together the support structure and the platform to which is attached constitute a pallet. As a result, a unique pallet is required for each version of the component associated with the assembly line.

SUMMARY OF THE INVENTION

A pallet that can be reconfigured to support multiple versions of a component associated with an assembly line is desired.

A pallet of the present invention includes a platform and a plurality of support assemblies located at multiple positions on the platform. One support assembly is associated with each support location of the component. The support assemblies each include a support element and a plurality of bases, one base for each version of the component to be supported.

The support element is positioned on the desired base. An interface on the base for receiving a footing of the support element places the support element in the desired location. The support element includes a locator. Once positioned on the base, the locator corresponds to a predetermined location on the component which has a mount for alignment. The height of the interface places the locator at the appropriate height for the mount of that version of the component.

The support element may be constrained by a linkage assembly. The linkage assembly has a foundation secured to the platform. A first arm is rotatably connected to the foundation with a first joint and a second arm is rotatably connected to the first arm with a second joint. An aperture for receiving the support element is defined by the second arm.

Once the footing for the support element is received by the interface of the base and a locking mechanism is secured, the location of the support element is fixed. One locking mechanism is associated with each support element. To configure the support assembly for another version of the component the locking mechanism is released. The footing is moved from the interface of the current base to the interface of another. The locking mechanism again secures the support element in position with the base.

The support assemblies allow the pallet to quickly and easily be reconfigured by a single operator. Associating a locking mechanism with each support element allows each support element to utilize only one linkage assembly for support and movement while providing selective restriction of movement in the vertical direction. Providing a reconfigurable pallet to be used with multiple versions of a component on an assembly line reduces costs.

The invention also includes an improved method for reconfiguring a pallet. The method comprises positioning a support element above one of a plurality of bases via movement of a linkage assembly, sliding the support element relative to the linkage assembly to mount the support element on the one of the plurality of bases, and moving a locking mechanism from a release position to a locked position.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
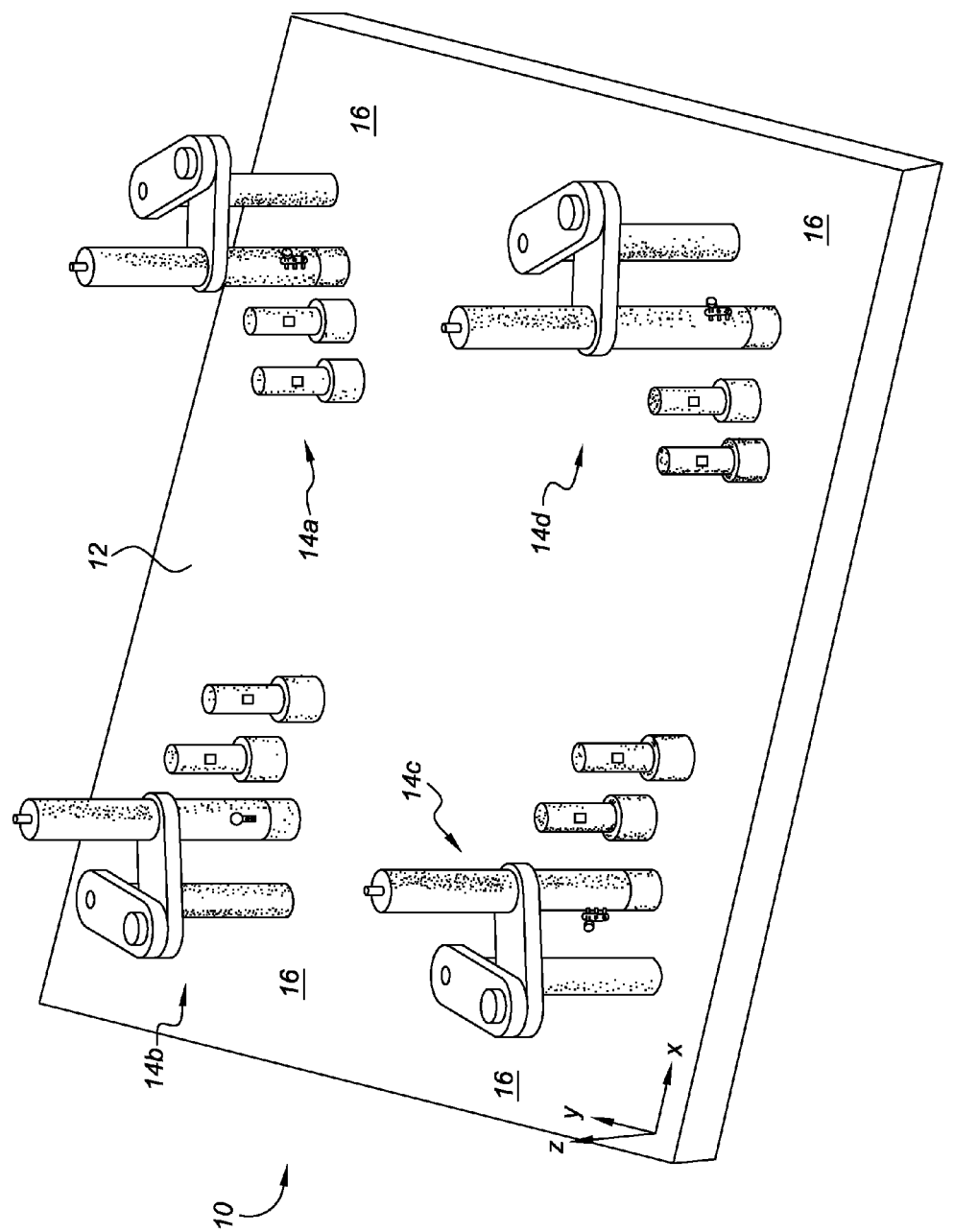
FIG. 1 is a perspective view illustrating a first embodiment of a reconfigurable pallet of the present invention.

Referring to the Figures, wherein like reference numbers refer to the same or similar components throughout the several views, FIG. 1 is a perspective view of an exemplary pallet 10 of the present invention.

The pallet 10 includes a platform 12 and a plurality of support assemblies 14 located at multiple positions on the platform 12. As shown, four support assemblies 14a-d are located one at each corner 16 of the platform 12. One support assembly 14 is associated with each support location for the component. The number and location of the support assemblies 14 is determined by the design and type of the component to be supported. An x, y and z direction are defined by the pallet 10. Each support assembly 14a-d is located at a specific x-y-z coordinate as described below.

Figure 2:
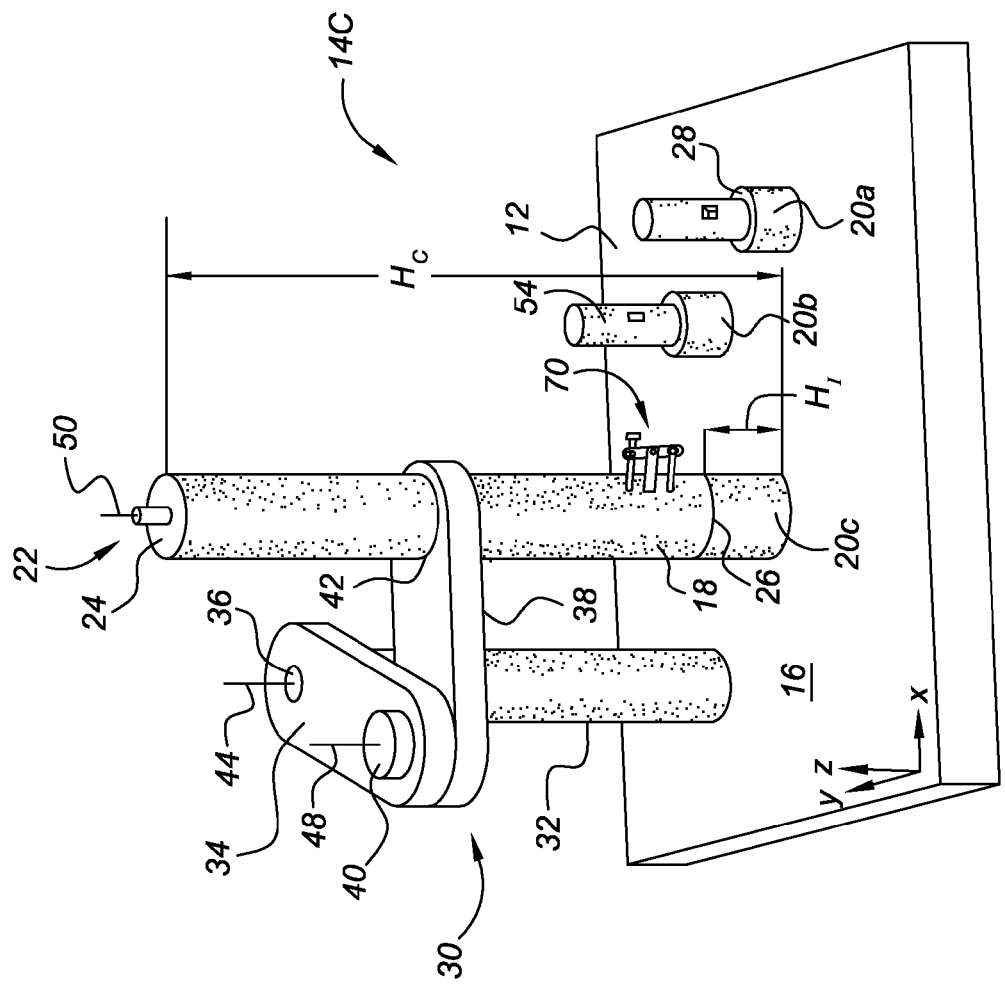
FIG. 2 is an enlarged perspective view of the first embodiment of one support assembly for the pallet of the present invention.

FIG. 2 illustrates an enlarged perspective view of one section of the pallet 10 showing one of the support assemblies 14c. The other support assemblies 14a, b and d on the pallet 10 are configured in the same manner as described herein. The support assembly 14c includes a support element 18 and a plurality of bases 20. Preferably, there are multiple bases 20, one base for each version of the component to be supported. In the embodiment of FIG. 2, there are three bases 20: a first base 20a, a second base 20b, and a third base 20c. Therefore, the example embodiment is of a pallet 10 for use with a component having three different configurations. For example, the component is an engine and three different engines are available for a vehicle assembled on the assembly line. The pallet 10 can be configured to support each version of the engine. Additional versions of the component can be accommodated by adding another base 20 at the appropriate location for each support assembly 14.

The support element 18 includes a locator 22 along an end 24, as shown. The locator 22 corresponds to a predetermined location on the component which has a mount for alignment with the locator 22. The locator 22 is positioned at a specific location and height to correspond to the component mount. In the embodiment shown, the locator 22 is a pin that could correspond to a female receptacle defined by the component at the mount. For example, the component is an engine and a pin receiver is positioned on the engine at the component mount location. Alternately, the locator 22 may be a support plane on the support element 18 that corresponds to a plane on the component at the mount. Other arrangements may be used for the locator 22, such as, a female receptacle defined by the locator 22 and a male coupling on the component at the mount.

The support element 18 is positioned on the desired base 20, in this instance base 20c. The support element 18 has a footing 26. The footing 26 couples with the desired base 20c. In the embodiment shown, the multiple bases 20a-c each have an interface 28 for mating with the footing 26. The interface 28 places the support element 18 in the desired x-y coordinate location. The interface height $H_I$ of the desired base 20c places the locator 22 at the appropriate component height $H_C$ for that version of the component. Therefore, each base 20a-c is associated with a specific x-y-z coordinate appropriate to the version of the component being supported on the pallet 10 by the base 20a-c.

Each support element 18 is constrained by a linkage assembly 30. The linkage assemblies 30 guide and support the support element 18 and ensure that there are no loose parts associated with the pallet 10 to prevent dropping parts during pallet reconfiguration. However, the support element 18 could be detached from the linkage assembly 30 if so desired. Each linkage assembly 30 has a foundation 32 secured to the platform 12. A first arm 34 is rotatably connected to the foundation 32 with a first joint 36. A second arm 38 is rotatably connected to the first arm 34 with a second joint 40. An aperture 42 for receiving the support element 18 is defined by the second arm 38 and is positioned remotely from the second joint 40. The support element 18 can freely rotate and slide in the z direction when located within the aperture 42.

The first joint 36 rotatably connects the first arm 34 to the foundation 32. The first arm 34 rotates about a first axis 44 that is oriented in the z direction. The second joint 40 rotatably connects the second arm 38 with the first arm 34. The second arm 38 rotates about a second axis 48 that is also oriented in the z direction, and is parallel to the first axis 44. The x-y coordinate location of the second axis 48 may be changed by rotating the first arm 34 about the first axis 44. Once the support element is mounted on the interface 28 rotation of the first arm 34 about the first axis 44 and the second arm 38 about the second axis 48 is prevented. This prevents movement of the first arm 34 and the second arm 38 relative to the foundation 32 and thus, to the platform 12.

A locking mechanism 70 is associated with each support element 18 to secure the support element 18 within the interface 28. Once the support element 18 is located within the interface 28 and the locking mechanism 70 is secured, rotation of the first arm 34 about the first axis 44 and the second arm 38 about the second axis 48 is prevented. Securing the locking mechanism 70 prevents movement of the first arm 34 and the second arm 38 relative to the foundation 32 and thus, to the platform 12. The size of bases 20a-c may have the same diameter as support element 18 also, to provide multiple x-y coordinate positions that are relatively close to one another.

The support element 18 rotates within the aperture 42 about a third axis 50 that is oriented in the z-direction and parallel to the first and second axes 44 and 48. The x-y coordinate location of the third axis 50 may be changed by rotating the second arm 38 about the second axis 48 when the support element 18 is not received within the interface 28. Once the footing 26 is received by the interface 28, the x-y coordinate location of the third axis 50 is fixed. In addition to the locking mechanism 70, gravity and weight of the component restrict the support element 18 from moving along the third axis 50 during pallet 10 usage.

To configure the support assembly 14a for another version of the component the locking mechanism 70 is released. The footing 26 is moved from the interface 28 of base 20c to the interface 28 of base 20a or 20b, as desired, and the support element 18 is moved within aperture 42 for vertical adjustment. The locking mechanism 70 is then secured to fix the support element 18 in position.

To reconfigure the entire pallet 10 this procedure is repeated for each of the support assemblies 14a-d located on the pallet 10. To ensure proper positioning of the support element 18 for each of the support assemblies 14a-d the bases 20 may be colored or numbered alike for each version of the component. That is, base 20a of support assembly 14c has a matching color to a similar base 20a of each of the support assemblies 14a, b and d on the pallet 10. Base 20b of support assembly 14c would have another color matching each similar base 20b of each of the support assemblies 14a, b and d and base 20c of support assembly 14c would have a third color matching each similar base 20c of each of the support assemblies 14a, b and d. Positioning the footings 26 for each support assembly 14a-d with similarly colored bases 20 to one another would ensure that the locators 22 are in the proper location for each version of the component. For example, the component is an engine and each version of the engine would have a color associated therewith. All of the bases 20 utilized to support that engine version would be of the associated color.

Additionally, the bases 20a-c for each support assembly 14a-d may have different interface heights $H_I$ than one another. That is, the interface height $H_I$ for the base 20a of the support assembly 14a may differ from the interface height of the base 20a of the support assembly 14b which differs from the interface height of the base 20a of the support assemblies 14c and 14d. Alternatively, all the bases 20a-c may be the same height and shims located between the base 20a-c and the platform 12 can be used to adjust the interface height $H_I$ for each base 20a-c. The interface height $H_I$ for the bases 20a-c is determined by the component mount requirement at each support assembly 14a-d location for that version of the component.

Figure 3:
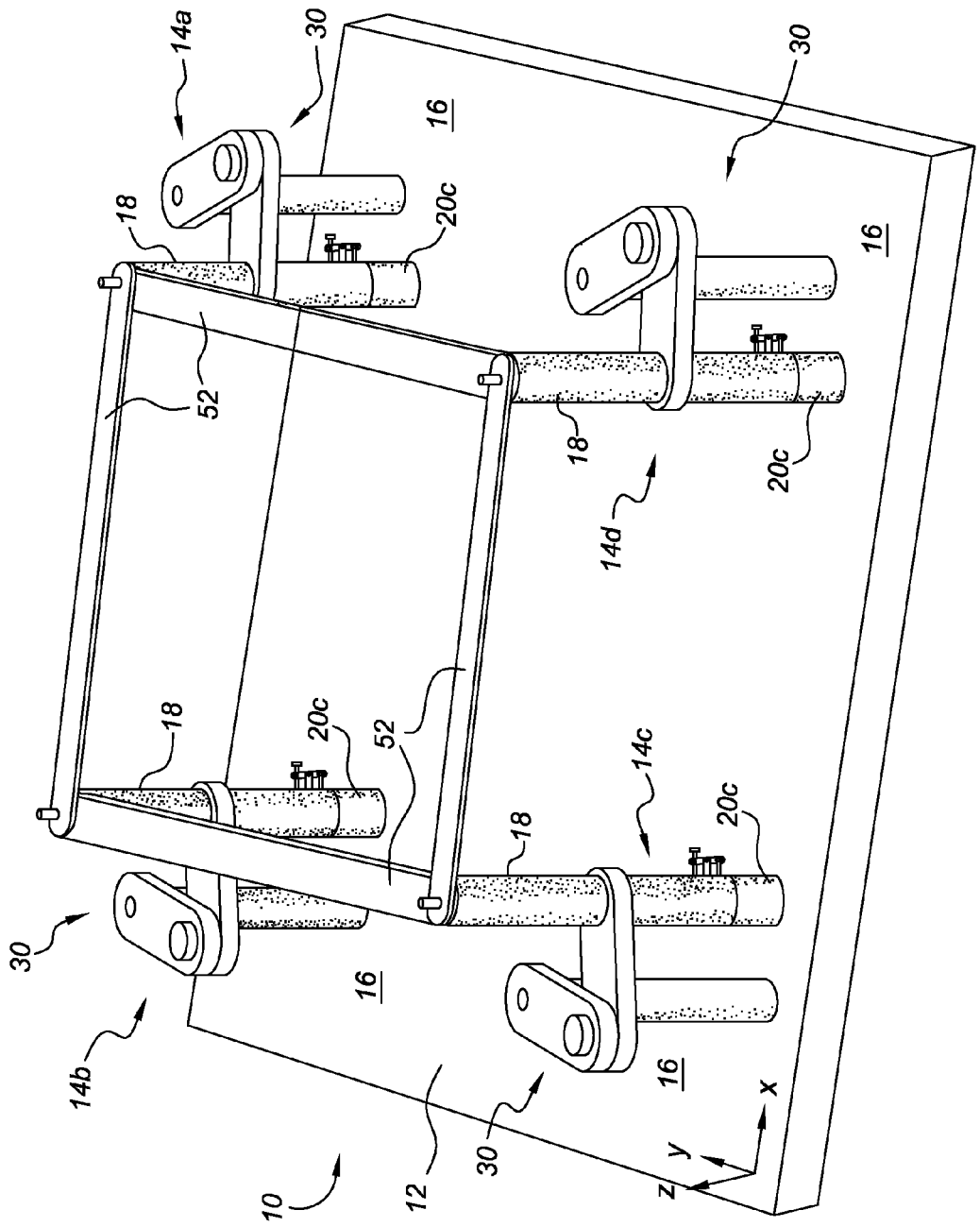
FIG. 3 is a perspective view illustrating the first embodiment of the reconfigurable pallet of the present invention supporting a component.

FIG. 3 illustrates support of one version of a component on the pallet 10. The support elements 18 and bases 20c for the one version of the component are shown. The remaining bases 20a, b and d of the support assemblies 14a-d are removed for simplicity. The component to be supported is represented by rigid links 52. Each interface 28 has an extension 54 (shown in FIG. 5). The extension 54 assists in aligning the support element 18 and the footing 26 and absorbs lateral forces, in the x or y direction, caused by the component during movement of the pallet 10.

Figure 4:
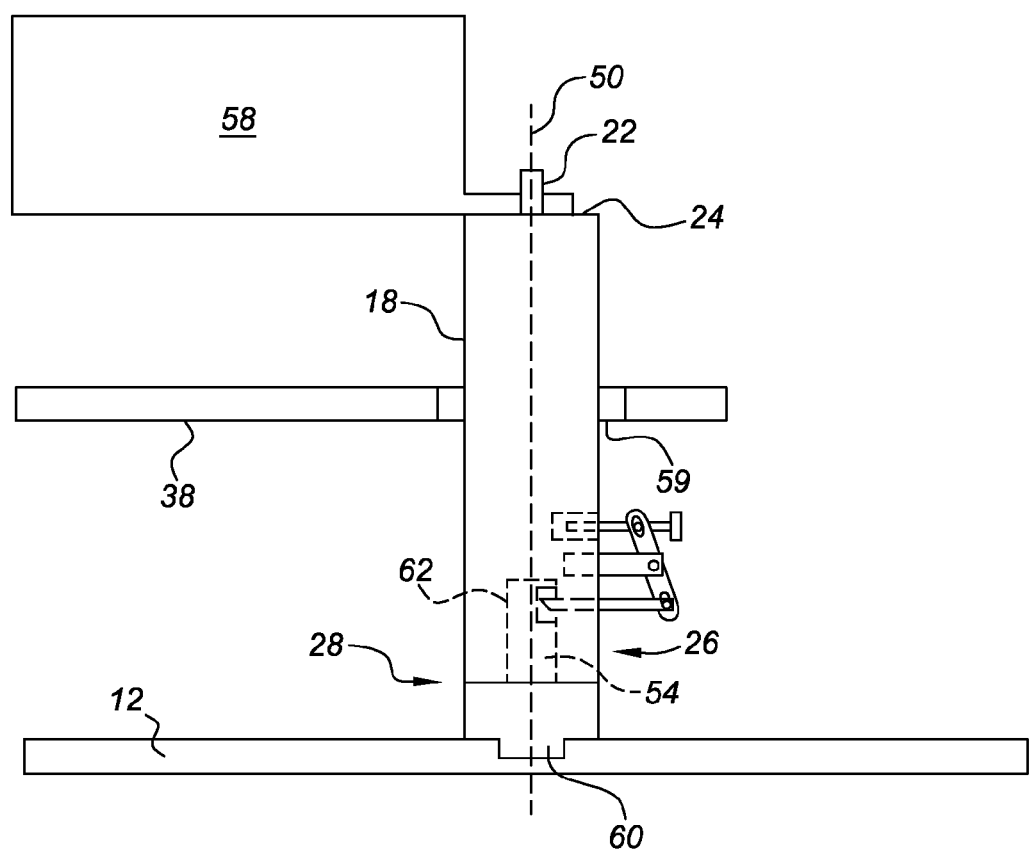
FIG. 4 is a side view of the first embodiment of one support element located in a base of the support assembly for the pallet of the present invention.

FIG. 4 is a side view of one support element 18 located in a base 20a. The component is represented by an element 58 mounted on the locator 22. The base 20a is secured to the platform 12 with a press fit between the platform 12 and a fitting portion 60 such as by a serrated surface or by other attachment means such as bolting, welding or brazing. The footing 26 of support element 18 defines a recess 62. The extension 54 of base 20a is received within the recess 62 of the support element 18. The footing 26 and extension 54 assist in absorbing lateral forces acting on the support element 18 by element 58. The second arm 38 of the linkage assembly 30 supports the support element 18. A bushing 59 may be located between the support element 18 and the second arm 38. The bushing 59 provides support to and allows rotational and vertical movement of the support element 18. Once the support element 18 is located on the base 20a the locking mechanism 70 and the component 58 prevent rotational and vertical movement of the support element 18.

Figure 5A:
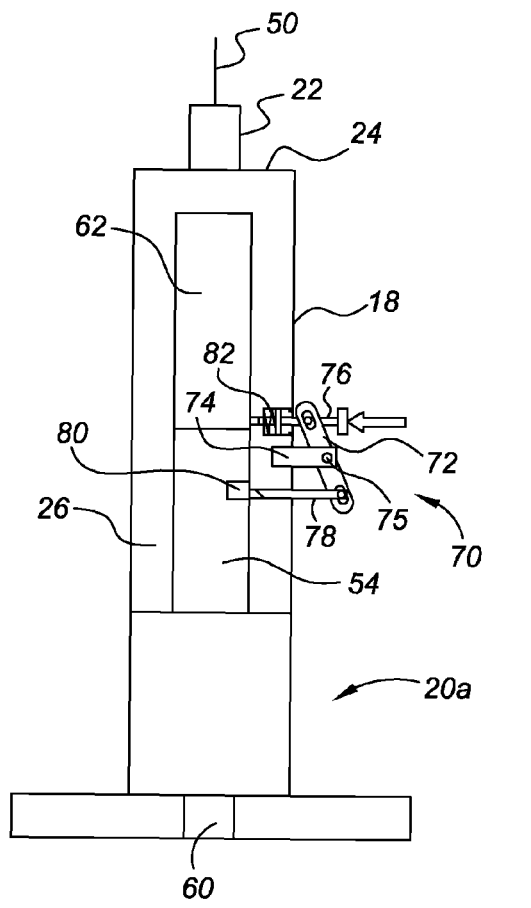
FIG. 5a is a side view of the first embodiment of a support element and locking mechanism in a released position for the pallet of the present invention.

FIG. 5a is a side view of the base 20 and the support element 18 illustrating a first embodiment of the locking mechanism 70 in an unlocked position. The extension 54 located on the base 20 is received within the recess 62 and the support element 18 is fully seated on the base 20. The locking mechanism 70 includes a lever 72. The lever 72 is secured to the support element 18 at a fulcrum 75 through an extension bar 74. An actuator 76 extends from a first end of the lever 72 to the support element 18. A locking bar 78 extends from a second end of the lever 72 through the support element 18. The locking bar 78 can be received within an opening 80 defined by the extension 54 when the support element 18 is seated on the base 20. The opening 80 can be located at one rotational position, as shown, or extend about the circumference of the extension 54. As illustrated by the arrow in FIG. 5a, pressure is applied by the operator to the actuator 76. The bias of a spring 82 is overcome and the lever 72 is rotated about the fulcrum 75. The locking bar 78 is not located within the opening 80 and the support element 18 is free to move in the vertical direction.

Figure 5B:
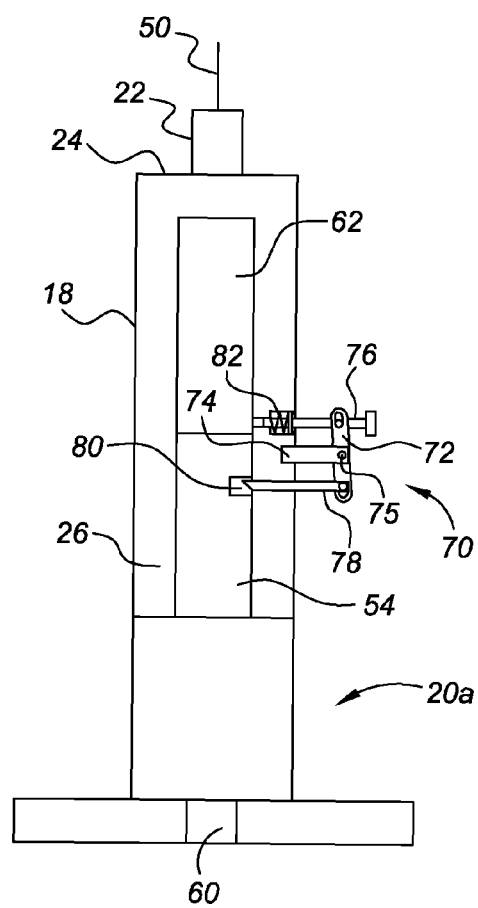
FIG. 5b is a side view of the first embodiment of a support element and locking mechanism in a locked position for the pallet of the present invention.
Figure 6:
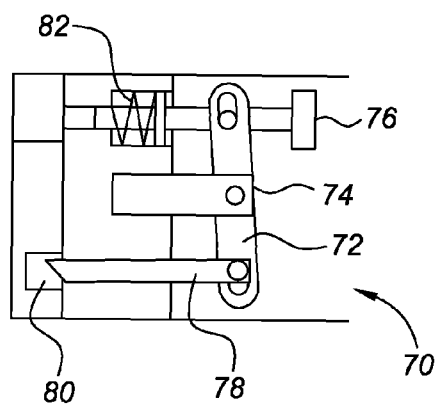
FIG. 6 is an enlarged side view of the first embodiment of the locking mechanism in a released position.

FIGS. 5b and 6 illustrate the locking mechanism 70 in the locked position. The operator is not applying pressure to the actuator 76. Thus, the spring 82 applies bias to the lever 72 and the locking bar 78 is received within the opening 80. Interference between the locking bar 78 and the extension 54 prevents vertical movement of the support element 18 relative to the base 20.

Figure 7:
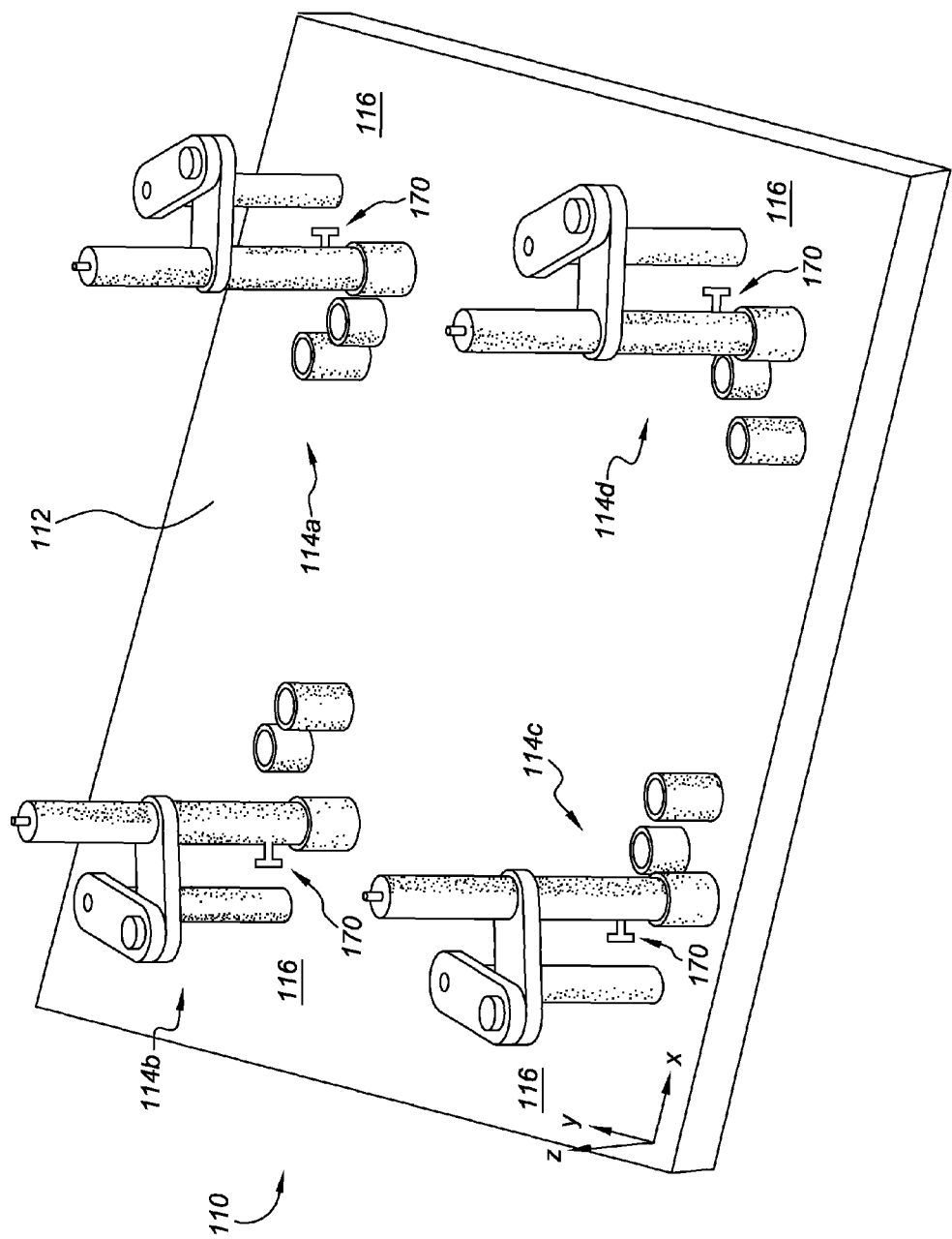
FIG. 7 is a perspective view illustrating a second embodiment of the reconfigurable pallet of the present invention.

FIG. 7 is a perspective view of another exemplary pallet 110 of the present invention. The pallet 110 includes a platform 112 and a plurality of support assemblies 114a-d located at multiple positions on the platform 112. As shown, four support assemblies 114a-d are located one at each corner 116 of the platform 112. X, y and z directions are defined by the pallet 110. Each support assembly 114a-d is located at a specific x-y-z coordinate as described below.

Figure 8:
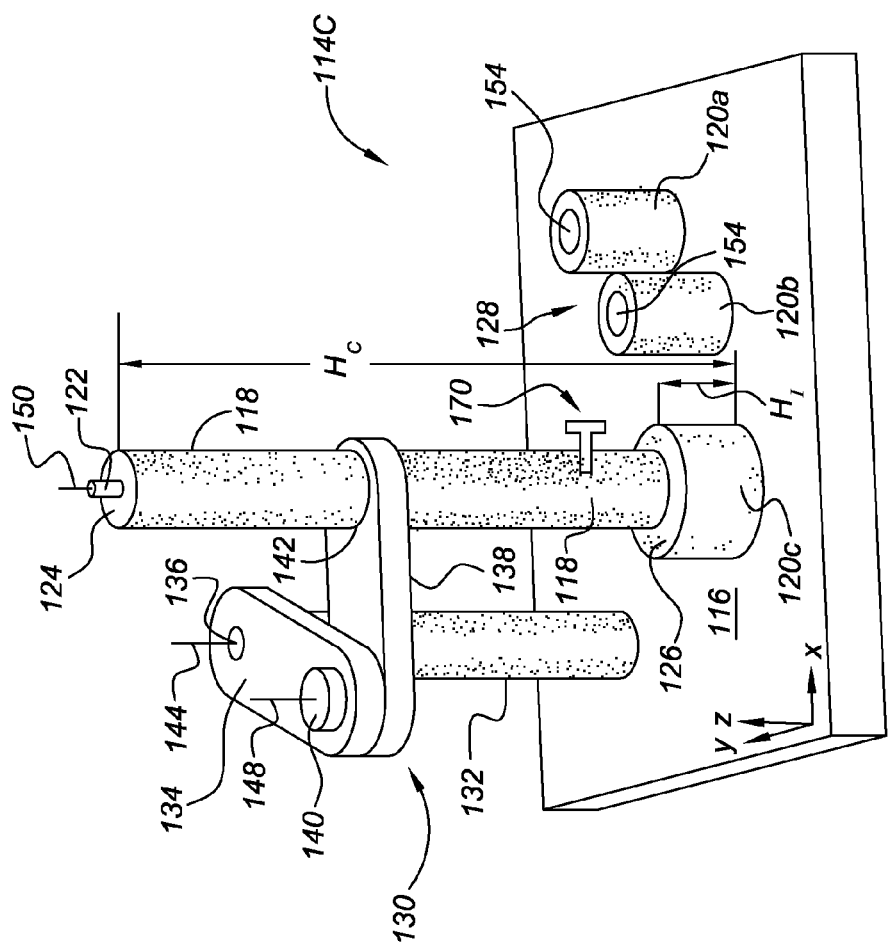
FIG. 8 is an enlarged perspective view of a second embodiment of one support assembly for the pallet of the present invention.

FIG. 8 illustrates an enlarged perspective view of one section of the pallet 110 showing one of the support assemblies 114c. The other support assemblies 114a, b and d on the pallet 110 are configured in the same manner as described herein. The support assembly 114c includes a support element 118 and a plurality of bases 120. In the embodiment of FIG. 8, there are three bases 120: a first base 120a, a second base 120b, and a third base 120c.

The support element 118 includes a locator 122 along an end 124. The locator 122 corresponds to a predetermined location on the component which has a mount for alignment with the locator 122. The locator 122 is positioned at a specific location and height to correspond to the component mount.

The support element 118 is positioned on the desired base 120, in this instance base 120c. The support element 18 has a footing 126. The footing 126 couples with the desired base 120c. In the embodiment shown, the multiple bases 120a-c each have an interface 128 for mating with the footing 126. The interface 128 places the support element 118 in the desired x-y coordinate location. The interface height $H_I$ of the desired base 120c places the locator 122 at the appropriate component height $H_C$ for that version of the component. Therefore, each base 120a-c is associated with a specific x-y-z coordinate appropriate to the version of the component being supported on the pallet 110 by the base 120a-c.

Each support element 118 is constrained by a linkage assembly 130. The linkage assemblies 130 guide and support the support element 118 and ensure that there are no loose parts associated with the pallet 110 to prevent dropping parts during pallet reconfiguration. Each linkage assembly 130 has a foundation 132 secured to the platform 112. A first arm 134 is rotatably connected to the foundation 132 with a first joint 136. A second arm 138 is rotatably connected to the first arm 134 with a second joint 140. An aperture 142 for receiving the support element 118 is defined by the second arm 138 and is positioned remotely from the second joint 140. The support element 118 can freely rotate and slide in the z direction when located within the aperture 142.

The first joint 136 rotatably connects the first arm 134 to the foundation 132. The first arm 134 rotates about a first axis 144 that is oriented in the z direction. The second joint 140 rotatably connects the second arm 138 with the first arm 134. The second arm 138 rotates about a second axis 148 that is also oriented in the z direction, and is parallel to the first axis 144. The x-y coordinate location of the second axis 148 may be changed by rotating the first arm 134 about the first axis 144.

A locking mechanism 170 is associated with each support element 118 to secure the support element 118 within the interface 128. Once the support element is located within the interface 128 and the locking mechanism 170 is secured, rotation of the first arm 134 about the first axis 144 and the second arm 138 about the second axis 148 is prevented. Securing the locking mechanism 170 prevents movement of the first arm 134 and the second arm 138 relative to the foundation 132 and thus, to the platform 112.

The support element 118 rotates within the aperture 142 about a third axis 150 that is oriented in the z-direction and parallel to the first and second axes 144 and 148. The x-y coordinate location of the third axis 150 may be changed by rotating the second arm 138 about the second axis 148 when the support element 118 is not received within the interface 128. Once the footing 126 is received by the interface 128, the x-y coordinate location of the third axis 150 is fixed. In addition to the locking mechanism 170, gravity and weight of the component restrict the support element 118 from moving along the third axis 150 during pallet 110 usage.

To configure the support assembly 114a for another version of the component of the locking mechanism 170 is released. The footing 126 is moved from the interface 128 of base 120c to the interface 128 of base 120a or 120b, as desired, and the support element 118 is moved within aperture 142 for vertical adjustment. The locking mechanism 170 is then secured to fix the support element 118 in position.

To reconfigure the entire pallet 110 this procedure is repeated for each of the support assemblies 114a-d located on the pallet 110. To ensure proper positioning of the support element 118 for each of the support assemblies 114a-d the bases 120 may be colored or numbered alike for each version of the component. Positioning the footings 126 for each support assembly 114a-d with similarly colored bases 120 to one another would ensure that the locators 122 are in the proper location for each version of the component.

Additionally, the bases 120a-c for each support assembly 114a-d may have different interface heights $H_I$ than one another. The interface height $H_I$ for the bases 120a-c is determined by the component mount requirement at each support assembly 114a-d location for that version of the component.

Figure 9:
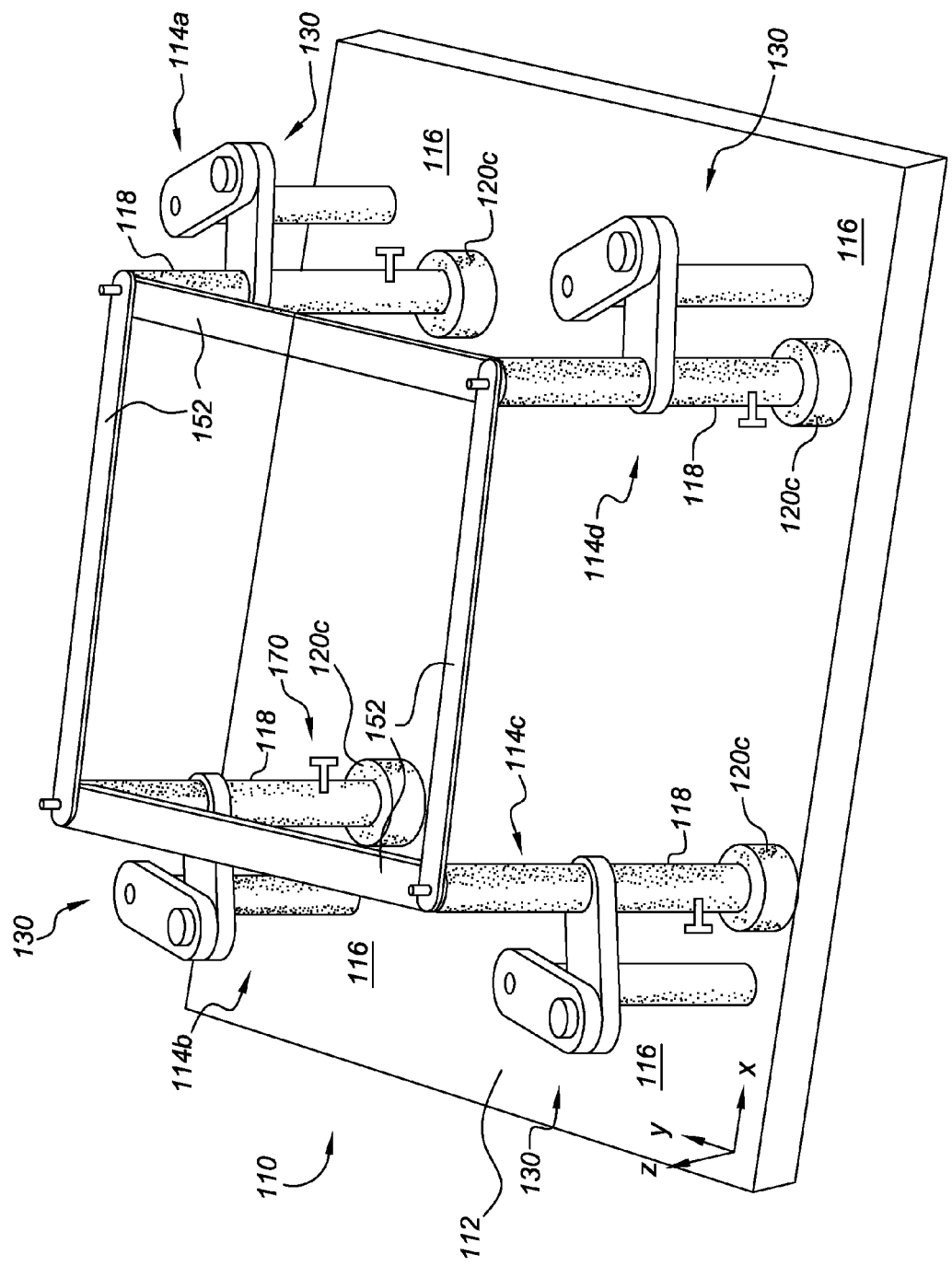
FIG. 9 is a perspective view illustrating the second embodiment of the reconfigurable pallet of the present invention supporting a component.

FIG. 9 illustrates support of one version of a component on the pallet 110. The support elements 118 and bases 120c for the one version of the component are shown. The remaining bases 120a, b and d of the support assemblies 114a-d are removed for simplicity. The component to be supported is represented by rigid links 152. Each interface 128 has an opening 154 (shown in FIG. 8). The opening 154 assists in aligning the support element 118 and absorbs lateral forces, in the x or y direction, caused by the component during movement of the pallet 110.

Figure 10:
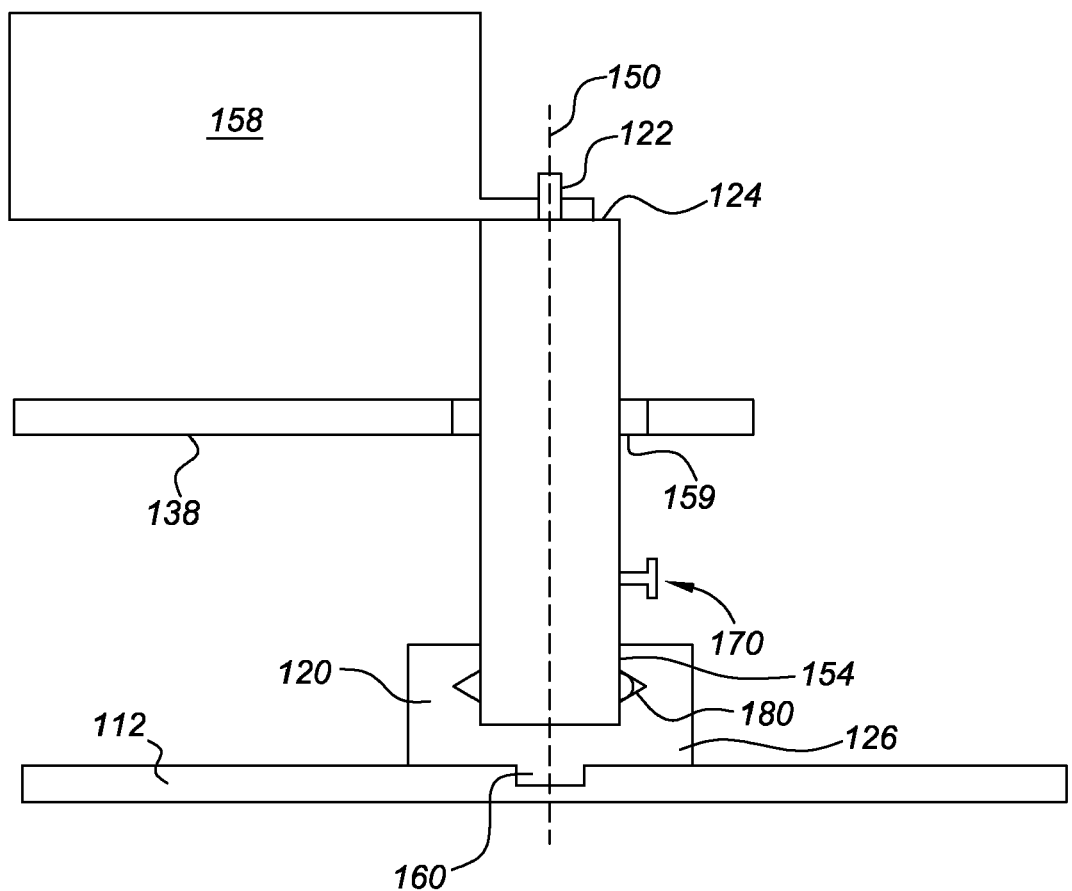
FIG. 10 is a side view of the second embodiment of one support element located in a base of the support assembly for the pallet of the present invention.

FIG. 10 is a side view of one support element 118 located in a base 120a. The component is represented by an element 158 mounted on the locator 122. The base 120a is secured to the platform 112 with a press fit between the platform 112 and a fitting portion 160 such as by a serrated surface or by other attachment means such as bolting, welding or brazing. The base 120 defines the opening 154. The footing 126 of the support element 118 is received within the opening 154 of the base 120. The footing 126 and opening 154 assist in absorbing lateral forces acting on the support element 118 by element 158. The second arm 138 of the linkage assembly 130 supports the support element 118. A bushing 159 may be located between the support element 118 and the second arm 138. The bushing 159 provides support to and allows rotational and vertical movement of the support element 118. Once the support element 118 is located on the base 120 the locking mechanism 170 and the component 158 prevent rotational and vertical movement of the support element 118.

Figure 11A:
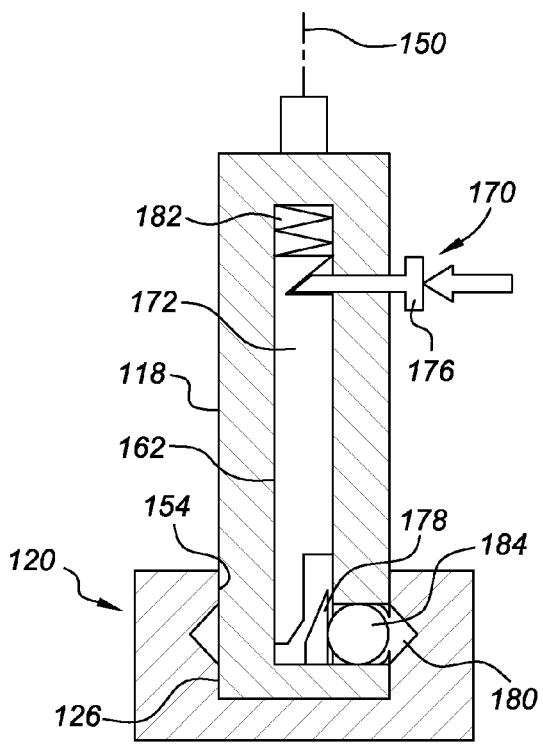
FIG. 11a is a cross-sectional view of the second embodiment of the support element and locking mechanism in a locked position for the pallet of the present invention.

FIG. 11a is a side view of the base 120 and the support element 118 illustrating a second embodiment of the locking mechanism 170 in a released position. An opening 154 is located on the base 120 to receive the footing 126 of the support element 118. As shown, the support element 118 is fully seated on the base 120.

The locking mechanism 170 includes a lever 172. The lever 172 is received within a recess 162 defined by the support element 118. An actuator 176 extends through the support element 118, such that an operator can selectively apply force to the lever 172. The lever 172 can move vertically within the recess 162 and is biased downward by a spring 182.

A wedge 178 is located within the recess 162 at a lower end of the support element 118. When the lever 172 is in the lower position due to spring bias (shown in FIG. 11b) the wedge 178 forces a locking ball 184 outward from the support element 118, i.e. in a direction perpendicular to axis 150, to be received within an annular groove 180 defined by the base 120. As illustrated by the arrow in FIG. 11a, pressure is applied by the operator to the actuator 176. The pressure from the actuator 176 overcomes the bias of the spring 182 and moves the lever 172 upward within the recess 162. The locking ball 184 is received within the support element 118 allowing the support element 118 to be moved vertically with respect to the base 120. If upward movement of the lever 172 does not cause the locking ball 184 to move into the support element 118 immediately, sliding the support element 118 vertically will provide enough pressure to move the locking ball 184 releasing the support element 118 from the base 120.

Figure 11B:
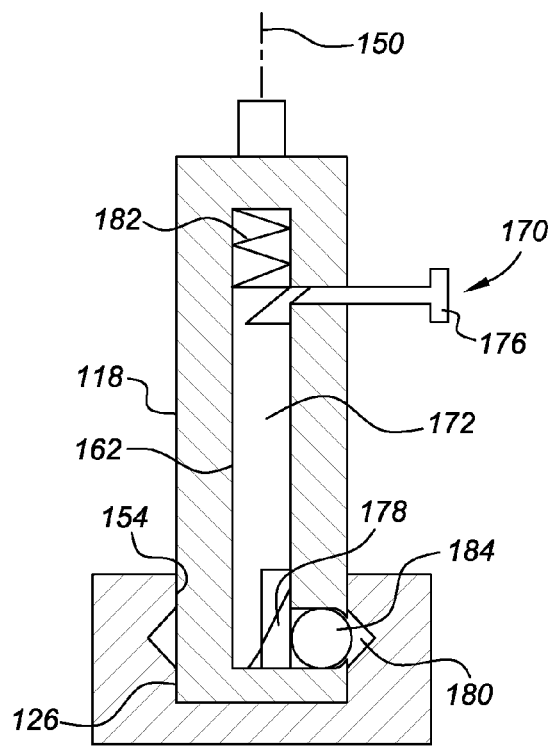
FIG. 11b is a cross-sectional view of the second embodiment of the support element and locking mechanism in a released position for the pallet of the present invention.

FIG. 11b illustrates the locking mechanism 170 in the locked position. The operator is not applying pressure to the actuator 176. Thus, the spring 182 applies bias to the lever 172. The lever 172 is moved to the downward position and the wedge 178 is forced outward forcing the locking ball 184 within the annular groove 180. Interference between the locking ball 184 and the base 120 along the annular groove 180 prevents vertical movement of the support element 118 relative to the base 120.

In the above embodiments an example of the component to be supported is an engine. This is in no way meant to be restrictive and other components may be utilized with the reconfigurable pallet of the present invention.

While the best modes for carrying out the invention have been described in detail, those familiar with the art to which this invention relates will recognize various alternative designs and embodiments for practicing the invention within the scope of the appended claims.

The invention claimed is:

1. A pallet for supporting a component for assembly operations comprising:
   a plurality of support assemblies each mounted to a platform wherein each of the plurality of support assemblies includes a support element which is rotatable and moveable to a plurality of predetermined positions for supporting the component, a plurality of bases fixed to the platform and each defining one of the plurality of predetermined positions, wherein each of the plurality of bases is configured to selectively receive the respective support element;
   a locking mechanism operatively connected to each support element to prevent vertical movement of the support element in each of the plurality of bases; and
   a locator defined on each of the support assemblies at a first end opposing the plurality of bases, wherein each of the plurality of predetermined positions defined by the plurality of bases places each locator at a respective predetermined height and linear position relative to the platform for supporting the component when the support element is received by each of the respective plurality of bases; and a plurality of linkage assemblies mounted to the platform, wherein each of the plurality of linkage assemblies is operatively connected to one of the plurality of support assemblies to enable movement of the support element to the plurality of positions and wherein the support element in each of the plurality of support assemblies is adjustable in a plurality of directions parallel to the platform via movement of a respective one of the plurality of linkage assemblies and adjustable in a direction perpendicular to the platform via the plurality of bases and sliding of the support element relative to the one of the plurality of linkage assemblies.

2. The pallet of claim 1, wherein each of the plurality of linkage assemblies further comprises a foundation secured to the platform, a first arm rotatably connected to the foundation and a second arm rotatably connected to the first arm, wherein the second arm defines an aperture to slideably and rotatably receive the support element.

3. The pallet of claim 1, wherein each of the plurality of bases defines an opening, and wherein the locking mechanism comprises a lever associated with the support element to selectively bias a locking member into engagement with the opening in each of the plurality of bases.

4. The pallet of claim 3, wherein a spring biases the lever into a locked position, and an actuator is associated with the lever to selectively move the lever to a released position.

5. The pallet of claim 3, wherein the locator is positioned at the first end of the support element, a footing is positioned at a second end of the support element, and wherein the footing defines a recess.

6. The pallet of claim 5, wherein the base includes an extension to be received within the recess of the footing, and wherein the extension defines an extension opening and the locking member is received within the extension opening when the locking mechanism is in a locked position.

7. The pallet of claim 5, wherein each of the plurality of bases defines an annular groove, and the locking member is received within the annular groove when the lever is located within the recess.

8. A support assembly for a reconfigurable pallet comprising:
   a linkage assembly secured to a platform;
   a support element rotatably and slideably mounted to the linkage assembly;
   a plurality of bases, wherein each of the plurality of bases is configured to selectively receive the support element; and
   a locking mechanism operatively connected to each support element to selectively prevent movement of the support element in a vertical direction;
   wherein each support element further comprises a locator positioned at a first end of the support element, a footing positioned at a second end of the support element, and wherein the footing defines a recess.

9. The support assembly of claim 8, wherein each of the plurality of bases defines an opening, and wherein the locking mechanism comprises a lever associated with the support element to selectively bias a locking member into engagement with the opening in each of the plurality of bases.

10. The support assembly of claim 9, wherein a spring biases the lever into a locked position, and an actuator is associated with the lever to selectively move the lever to a released position.

11. The support assembly of claim 8, wherein the base includes an extension to be received within the recess of the footing, and wherein the extension defines an extension opening and the locking member is received within the extension opening when the locking mechanism is in a locked position.

12. The support assembly of claim 11, wherein the locking member is a locking bar.

13. The support assembly of claim 8, wherein each of the plurality of bases defines an annular groove, and the locking member is received within the annular groove when the lever is located within the recess.

14. The support assembly of claim 13, wherein the locking member is a locking ball.

15. A method for reconfiguring a pallet comprising:
   positioning a support element above one of a plurality of bases fixed to the pallet at a predetermined location, wherein each of the plurality of bases is configured to selectively receive the support element;
   mounting the support element on the one of the plurality of bases such that a locator positioned at a first end of the support element is placed at a predetermined height and linear position relative to the pallet and operatively connected to the respective one of the plurality of bases and an extension of the respective base is received within a recess positioned at a second end of the support element; and
   actuating a locking mechanism to move from a released position to a locked position to prevent vertical movement of the support element, wherein the locking mechanism is operatively connected to the support element.

16. The method of claim 15, wherein the positioning of the support element above the one of the plurality of bases is via movement of a linkage assembly and wherein the mounting of the one of the plurality of bases is through sliding the support element relative to the linkage assembly.

17. The method of claim 15, further comprising actuating the locking mechanism to move from the locked position to the released position, removing the support element from the one of the plurality of bases and repeating the positioning and the actuating of the locking mechanism of the support element on another of the plurality of bases.

18. The method of claim 15, further comprising actuating the locking mechanism to move from the locked position to the released position, sliding the support element relative to the linkage assembly to remove the support element from the one of the plurality of bases and repeating the positioning, the sliding, and the actuating of the locking mechanism of the support element relative to another of the plurality of bases.

* * * * *